A. E. LINENDOLL.
METHOD OF ATTACHING UNIVERSAL JOINT SPIDERS TO TUBULAR PROPELLER SHAFTS.
APPLICATION FILED MAY 13, 1920.
1,375,852.
Patented Apr. 26, 1921.
2 SHEETS—SHEET 1.
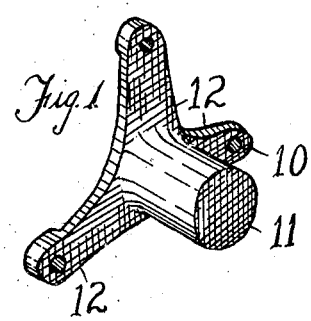
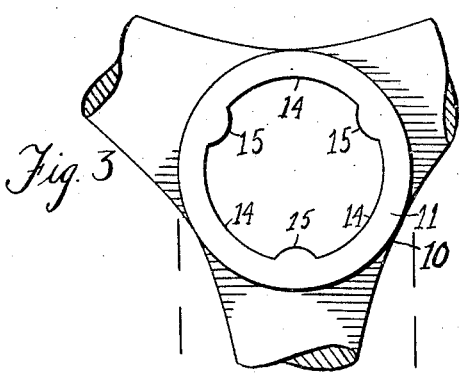
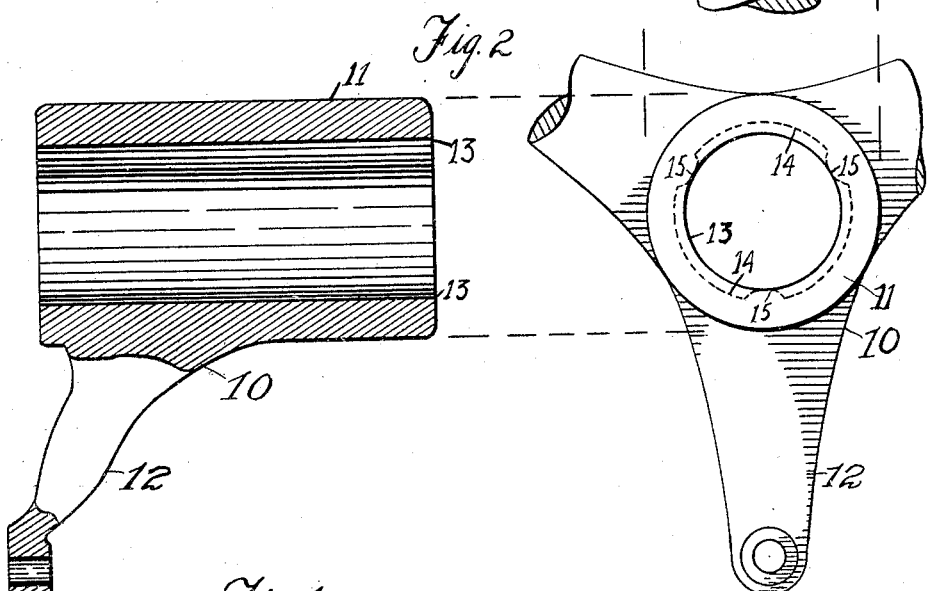
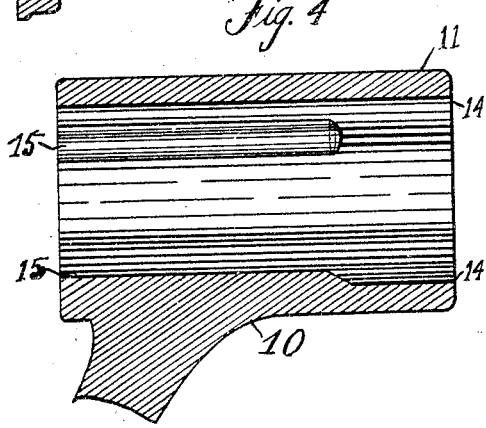
Inventor
Asa E. Linendoll
By S. Arthur Baldwin,
Attorney A. E. LINENDOLL.
METHOD OF ATTACHING UNIVERSAL JOINT SPIDERS TO TUBULAR PROPELLER SHAFTS.
APPLICATION FILED MAY 13, 1920.
1,375,852. Patented Apr. 26, 1921.
2 SHEETS—SHEET 2.
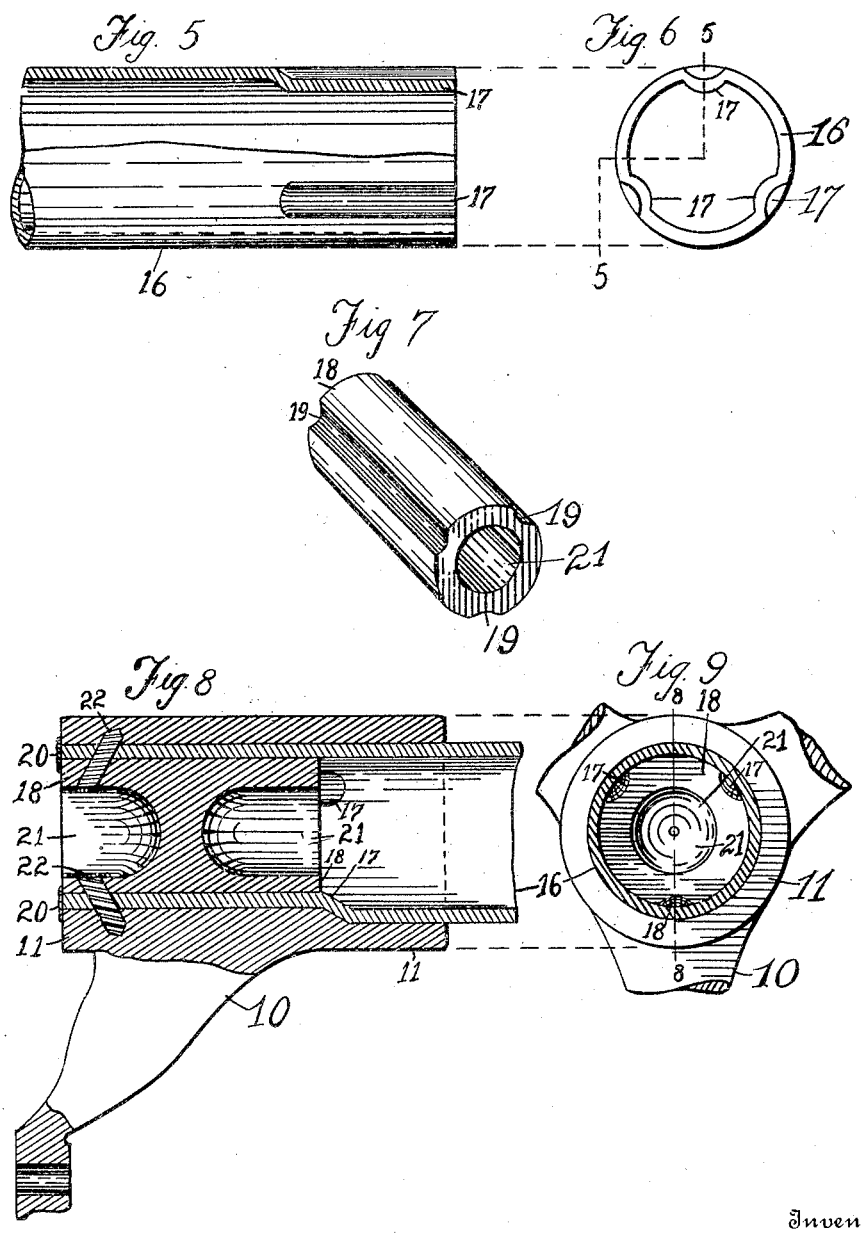

UNITED STATES PATENT OFFICE.

ASA E. LINENDOLL, OF NORWALK, OHIO.

METHOD OF ATTACHING UNIVERSAL-JOINT SPIDERS TO TUBULAR PROPELLER-SHAFTS.

1,375,852.     Specification of Letters Patent.     Patented Apr. 26, 1921.

Application filed May 13, 1920. Serial No. 381,111.

*To all whom it may concern:*

Be it known that I, ASA E. LINENDOLL, a citizen of the United States, residing at the city of Norwalk, in the county of Huron and State of Ohio, have invented certain new and useful Improvements in Methods of Attaching Universal-Joint Spiders to Tubular Propeller-Shafts, of which the following, taken in connection with the accompanying drawings, is a specification.

The invention relates to metal joints, and particularly to methods of joining metal tubing to solid metallic connections; and the object of the improvement is to provide a simple and strong method of attaching a sheet metal tube to a universal joint spider, such as are particularly designed for use in connection with automobile construction, and has for its primary object the provision of a simple and efficient means for retaining the tubular propeller shaft correctly in position within the hub of the spider and to hold the same rigid as against torsional strain as well as all other strains that may come upon said tubular shaft; and the further object of said invention is to provide a method whereby any piece of tubing may be united to a universal joint spider so that the elements shall be as light as possible, yet held absolutely rigid and capable of withstanding any strain to which it may be subjected in the use for which it is particularly adapted; and the invention consists in the novel features and combinations hereinafter set forth and claimed.

In the drawings, Figure 1 is a perspective view of a spider forging or casting with an undrilled hub. Fig. 2 shows a vertical sectional and end elevation of said hub after drilling said hub, said end elevation showing in dotted lines the portions to be cut away, leaving the holding ribs or lengthwise bosses on the inner periphery of the hub bore; and Fig. 3 is an end elevation with said dotted line portions cut or broached away, showing the plurality of ribs which extend the full length of the bore of said hub when first broached. Fig. 4 is a vertical sectional view of said hub with said ribs cut back a spaced distance from the top end of said spider hub. Fig. 5 shows a sectional view of the tubular shaft at line 5—5 in Fig. 6; and Fig. 6 is an endwise elevation of said tubular shaft. Fig. 7 is a perspective view of the holding plug for said tubular shaft within the hub of said spider. Fig. 8 is a vertical sectional view at line 8—8 in Fig. 9 showing the construction and arrangement of the completed joint; and Fig. 9 is a top plan view of the spider with the tubular shaft in section and showing the holding plug within the same.

Like characters of reference refer to corresponding parts in the several views.

The numeral 10 designates the spider which has the hub 11 with a plurality of feet or legs 12, said hub 11 being first forged or cast solid as shown in Fig. 1.

The hub 11 is then drilled as shown in section and elevation in Fig. 2 with the hole 13 through said hub, after which the parts 14 between the ribs 15, preferably three, are broached away, leaving the lengthwise ribs 15 which extend the full length of the hole or bore 13. A larger drill is then used to counterbore, having a diameter of the broached away portions 14 on the top end of said hub 11, cutting the ribs 15 back for a spaced distance, preferably about one-fourth of the length of said bore.

The tubular shaft 16 is then shaped by means of suitable dies with the inwardly bent ribs or grooves 17 according as the inner or outer sides of the tube 16 are referred to, which tube 16 fits within the bore of the hub 11, the ribs 17 fitting over the ribs 15 as to length and size. Said tubular shaft 16 is forced down over said ribs and into the space therebetween.

A metal plug 18 is provided with lengthwise grooves which fit over the inwardly bent ribs 17 within the tube and spiders. Said plug 18 is shaped to a tight fit within the tubular shaft 16 so that when forced into said hub and the tube 16 therein, it will hold said parts firmly in attachment to one another, the plurality of ribs in the tube 16 and inner wall of the hub bore holding firmly against all torsional strain.

In all automobile construction at the present time, it is extremely desirable to lighten the same as much as possible. My present construction permits the plug 18 and spider 10 being made of aluminum, while the tube 16 is made of steel. Of course, the aluminum plug 18 and spider 10 cannot be welded at the end to prevent endwise motion on the part of the steel tube 16, within the spider 10 as shown at 20, which welding or soldering can be accomplished where the parts are made of metal or metals which permit such welding or soldering. In order to attach the aluminum spider 10 and aluminum plug 18 to a steel tube 16, the spider is made as hereinbefore described with the ribs 15 which fit within the inwardly bent ribs 17 within the tube 16.

The ends or central portions of the plug 18 may be lightened greatly by being drilled away at each end as shown at 21. The drilled or cut-away portion 21 permits a large alloy pin 22 being inserted in a suitable hole drilled through the plug 18, tube 16 and a spaced distance into the spider 11. If the pin 22 is made of the proper alloy, it may be welded or soldered to the aluminum plug 18. A single pin 22 may be used, or a plurality of said pins as shown in Fig. 8, according to the strength required to hold the parts firmly in position particularly as against endwise movement.

It is apparent by this method of attachment, that the tube 16 may be firmly attached in the spider 10 and will hold against all strain, the ribs or lengthwise bosses 17 extending three-fourths the length of the bore of the hub 11 holding firmly against all torsional strain, and the remaining one-fourth of the counter bore portion of the hub being the same size as the tube 16 receives said tube more firmly, locking the same within the hub of the spider.

I claim as new:

1. A method of attachment for a tube to a spider which consists in drilling the forged blank of the spider and broaching away portions of the bore of said drilled spider hub to leave spaced ribs therein, shaping the end of the tube with similarly spaced grooves or inwardly bent ribs to fit said spaced ribs within the bore of said spider hub, and a similarly grooved plug attached within said tube to hold said parts in rigid attachment to one another.

2. A method of attaching a tube to a spider which consists in providing a spider, a plurality of spaced lengthwise ribs in the bore of said spider, a tube having a similar plurality of spaced lengthwise grooves therein fitting said ribs to hold as against torsional strain, a plug having a similar plurality of grooves to fit within said tube and spider, and means for holding said plug and tube and spider in a fixed relation to one another.

3. A method of attaching a tube to a spider which consists in providing a spider, a plurality of spaced ribs lengthwise of a portion of the length of the bore of said spider, a tube having a similar plurality of grooves fitting in and around said ribs and spider bore, a tubular plug having spaced grooves to fit within and around said ribs, and a pin to hold said plug and tube and spider in fixed attachment to one another.

In testimony whereof I have affixed my signature in the presence of two witnesses.

ASA E. LINENDOLL.

Witnesses:
C. V. SWANSON,
THEO. HAAG.